US010649544B2

(12) United States Patent
Suh et al.

(10) Patent No.: US 10,649,544 B2
(45) Date of Patent: May 12, 2020

(54) DATA OUTPUT DEVICE

(71) Applicant: SAMSUNG ELECTRONICS CO., LTD., Suwon-si (KR)

(72) Inventors: Yunjae Suh, Suwon-si (KR); Keun Joo Park, Seoul (KR); Sung Ho Kim, Yongin-si (KR); Junseok Kim, Hwaseong-si (KR); Hyunsurk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 152 days.

(21) Appl. No.: 15/600,135

(22) Filed: May 19, 2017

(65) Prior Publication Data

US 2018/0059805 A1    Mar. 1, 2018

(30) Foreign Application Priority Data

Sep. 1, 2016    (KR) .......................... 10-2016-0112542

(51) Int. Cl.
*G06F 3/042*    (2006.01)
*G06F 3/03*    (2006.01)
(Continued)

(52) U.S. Cl.
CPC .......... *G06F 3/0304* (2013.01); *G01J 1/0238* (2013.01); *G01J 1/4228* (2013.01); *G02B 27/0087* (2013.01); *G06F 3/0383* (2013.01); *G06F 3/03547* (2013.01); *G06F 3/042* (2013.01); *G06F 3/0416* (2013.01); *G01J 2001/448* (2013.01); *G06F 2203/04108* (2013.01)

(58) Field of Classification Search
CPC .... G06F 3/0304; G06F 3/03547; G06F 3/042; G06F 3/0416; G06F 3/0383;
(Continued)

(56) References Cited

U.S. PATENT DOCUMENTS 7,019,274 B2    3/2006    Yamada
7,859,582 B2    12/2010    Gomi
(Continued)

FOREIGN PATENT DOCUMENTS

JP    4264251 B2    5/2009
JP    4315032 B2    8/2009
(Continued)

OTHER PUBLICATIONS

Farian et al., A Bio-Inspired AER Temporal Tri-Color Differentiator Pixel Array, Oct. 2015, IEEE Transactions on Biomedical Circuits and Systems, vol. 9, No. 5, pp. 686-698 (Year: 2015).*

*Primary Examiner* — Toan M Le
(74) *Attorney, Agent, or Firm* — Sughrue Mion, PLLC

(57) ABSTRACT

Provided is a data output device that includes an event array including a plurality of sensing elements; a first event identifier connected to a first sensing element among the plurality of sensing elements and configured to identify first element information corresponding to the first sensing element in response to the case where an event is detected by the first sensing element; a second event identifier connected to a second sensing element among the plurality of sensing elements and configured to identify second element information corresponding to the second sensing element in response to the case where the event is detected by the second sensing element; and an event output interface configured to output event information based on at least one of the first element information and the second element information.

16 Claims, 10 Drawing Sheets

(51) Int. Cl.
*G06F 3/0354* (2013.01)
*G06F 3/038* (2013.01)
*G06F 3/041* (2006.01)
*G01J 1/02* (2006.01)
*G01J 1/42* (2006.01)
*G02B 27/00* (2006.01)
*G01J 1/44* (2006.01)

(58) Field of Classification Search
CPC .......... G06F 2203/04108; G01J 1/0238; G01J 1/4228; G01J 2001/448; G02B 27/0087
See application file for complete search history.

(56) References Cited

U.S. PATENT DOCUMENTS

| | | |
|---|---|---|
| 8,749,695 B2 | 6/2014 | Kita |
| 9,055,242 B2 | 6/2015 | Kim et al. |
| 9,257,461 B2 | 2/2016 | Cho et al. |
| 2004/0169125 A1 | 9/2004 | Yamada |
| 2007/0285548 A1 | 12/2007 | Gomi |
| 2012/0188425 A1 | 7/2012 | Kita |
| 2014/0009650 A1 | 1/2014 | Kim et al. |
| 2014/0320403 A1* | 10/2014 | Lee .......................... G06T 7/20 345/156 |
| 2015/0029355 A1 | 1/2015 | Kim et al. |
| 2015/0069218 A1 | 3/2015 | Cho et al. |
| 2015/0302710 A1 | 10/2015 | Jin et al. |

FOREIGN PATENT DOCUMENTS

| | | |
|---|---|---|
| JP | 4908067 B2 | 4/2012 |
| KR | 10-2014-0006465 A | 1/2014 |
| KR | 10-2015-0014007 A | 2/2015 |
| KR | 10-2015-0020424 A | 2/2015 |
| KR | 10-2015-0029285 A | 3/2015 |
| KR | 10-2015-0120124 A | 10/2015 |

* cited by examiner

DATA OUTPUT DEVICE

CROSS-REFERENCE TO THE RELATED APPLICATION

A claim for priority under 35 U.S.C. § 119 is made to Korean Patent Application No. 10-2016-0112542 filed Sep. 1, 2016, in the Korean Intellectual Property Office, the entire contents of which are hereby incorporated by reference.

BACKGROUND

A sensor with a plurality of elements may include a detection element that senses a signal for each element, an analog circuit to amplify the signal sensed by the detection element, and a digital circuit to process the amplified signal.

However, data may be randomly generated according to usage conditions, environmental conditions, and other situations, resulting in data that is not uniformly generated for an element in a uniform location. In this case, power is unnecessarily consumed by searching all of the elements, thereby causing a decrease in an efficiency of processing signals in the digital circuit.

SUMMARY

According to an aspect of an example embodiment, a data output device includes: an event array including a plurality of sensing elements; a first event identifier connected to a first sensing element among the plurality of sensing elements and configured to identify first element information corresponding to the first sensing element in response to the case where an event is detected by the first sensing element; a second event identifier connected to a second sensing element among the plurality of sensing elements and configured to identify second element information corresponding to the second sensing element in response to the case where the event is detected by the second sensing element; and an event output interface configured to output event information based on at least one of the first element information and the second element information.

According to another aspect of another example embodiment, a data output device includes: an event array including a plurality of sensing elements, the plurality of sensing elements being classified into n groups; n event identifiers, each of the event identifiers being configured to identify element information corresponding to a sensing element classified into a corresponding group of the n groups; and an event output interface configured to output event information based on the element information, each of the n event identifiers being configured to identify element information corresponding to a sensing element at which an event is detected, in response to the case where the event is detected by a sensing element belonging to a corresponding group of the n groups, and n being an integer greater than zero.

According to an aspect of yet another example embodiment, there is provided a data output device including: a first event identifier configured to generate first event information; a second event identifier configured to generate second event information; an event output interface configured to receive the first event information the second event information, and generate an output signal based on at least one among the first event information and the second event information; a plurality of first sensing elements, each of the plurality of first sensing elements being configured to transmit an event signal to the first event identifier in response to a change; and a plurality of second sensing elements, each of the plurality of second sensing elements being configured to transmit an event signal to the second event identifier in response to a change.

DETAILED DESCRIPTION

Figure 1:
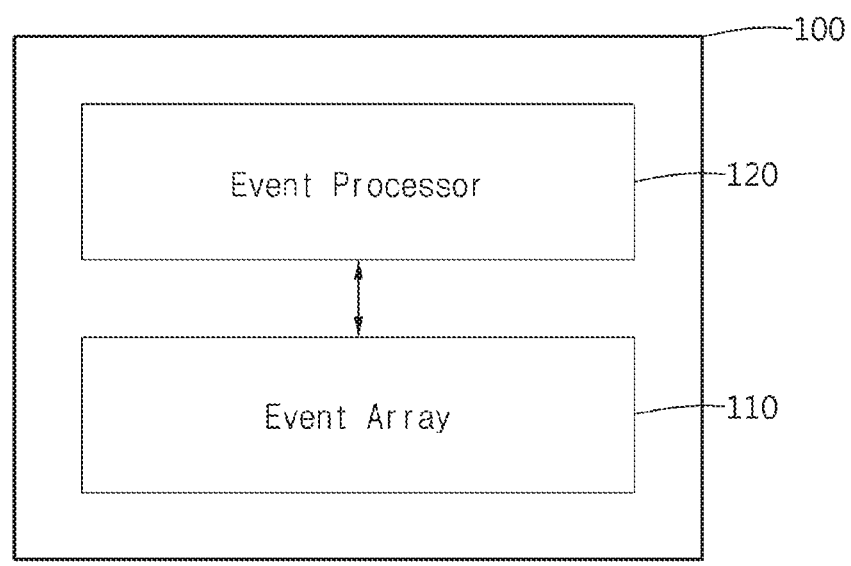
FIG. 1 is a block diagram illustrating a configuration of a data output device, according to an example embodiment.

Example embodiments may be diversely modified. Specific example embodiments are illustrated in the drawings and described in detail. However, it is to be understood that the present disclosure is not limited to example embodiments specifically described herein, but includes all modifications, equivalents, and substitutions without departing from the scope and spirit of the present disclosure.

FIG. 1 is a block diagram illustrating a configuration of a data output device, according to an example embodiment.

A data output device 100 includes an event array 110 and an event processor 120.

The event array 110 may indicate an array that is configured to receive a plurality of data. According to an example embodiment, the event array 110 may receive a plurality of data that are generated in response to occurrence of an event. For example, the event array 110 may include "M" sensing elements in a row direction and may include "N" sensing elements in a column direction. The row direction may indicate, for example, a lateral direction, and the column direction may indicate, for example, a longitudinal direction. Here, "N" and "M" may be an integer of 1 or more. Each of the sensing elements may indicate a unit to receive data.

For example, the event array 110 may be an event-based vision sensor. In the case where the event array 110 is the event-based vision sensor, each sensing element may sense occurrence of a predetermined event and may output an event signal. Here, the event may include an event in which the intensity of light changes, etc. For example, the event may be sensed and the event signal corresponding to the event may be output by the vision sensor that is based on an event to photograph an external object. However, the event is not limited to the above-described example and may include other events in which various physical, chemical, biological, and electrical elements change, such as sound, acceleration, and an electrical signal. Also, the event array 110 may not be limited to the event-based vision sensor.

The event processor 120 may receive data from the event array 110 and may transfer the received data to another device, module, unit, equipment, etc. For example, the event processor 120 may receive data, which are generated asynchronously, from the event array 110. According to an example embodiment, the event processor 120 may efficiently receive data from a portion of the event array 110 in which data are generated, not the whole event array 110. The event processor 120 may encode and transfer the received data or may transfer the received data itself without encoding. For example, the event processor 120 may output an event signal that is detected at the event array 110 and data that indicates a location of a sensing element at which the event signal is detected.

Figure 2:
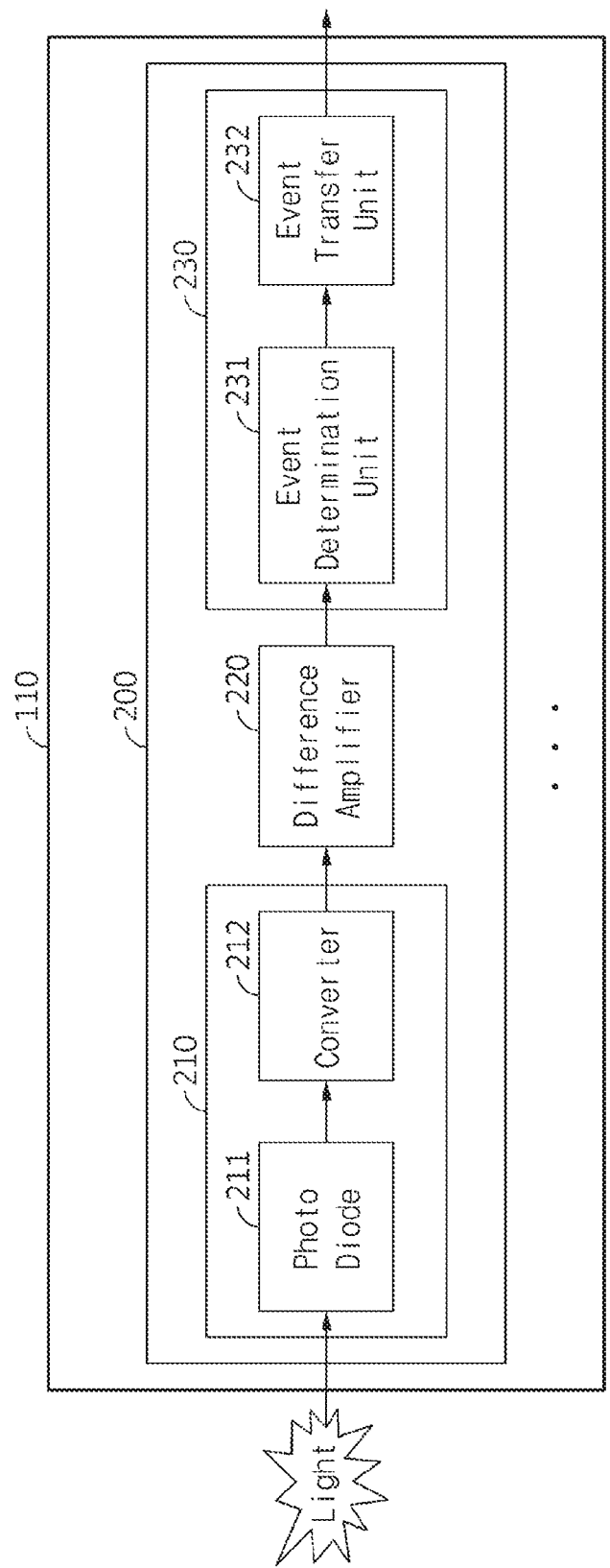
FIG. 2 is a block diagram illustrating a configuration of a sensing element, according to an example embodiment.

FIG. 2 is a block diagram illustrating a configuration of a sensing element, according to an example embodiment.

The event array 110 includes a plurality of sensing elements. A sensing element 200 may sense occurrence of a predetermined event and may output an event signal.

An event-based vision sensor may asynchronously output an event signal in response to sensing a change in the intensity of incident light. For example, in the case where the event-based vision sensor senses the event that the intensity of light increases at a specific sensing element 200, the corresponding sensing element 200 may output an ON event signal. Likewise, in the case where the event-based vision sensor senses the event that the intensity of light decreases at the specific sensing element 200, the corresponding sensing element 200 may output an OFF event signal.

Unlike a frame-based vision sensor, the event-based vision sensor may output an event signal only in the sensing element 200 of a portion at which the intensity of light changes, without scanning outputs of photo diodes 211 of pixels in units of a frame. A change of the intensity of incident light on the event-based vision sensor may result from movement of an external object or the event-based vision sensor.

For example, in the case where a light source is substantially fixed in process of time and an external object does not emit light by itself, the event-based vision sensor may sense incident light that is generated by the light source and is reflected by the external object. In the case where the external object, the light source, and the event-based vision sensor do not move, light that is reflected by the external object that is in a stationary state does not change substantially, and thus, the intensity of incident light on the event-based vision sensor may not change. In contrast, in the case where the external object moves, light that is reflected by a moving external object may change with movement of the external device, and thus, a change of the intensity of incident light on the event-based vision sensor may occur.

An event signal that is output in response to the movement of the external object may be information that is asynchronously generated and may be information that is similar to an optic nerve signal transferred from the retina of a human to a brain. For example, the event signal may not be generated with respect to a stationary object and may be generated only when a moving object is sensed.

The event-based vision sensor may make use of only address (coordinate) and/or time information of the sensing element 200 in which the intensity of light changes, and thus, the amount of information to be processed may markedly decrease compared with a general image camera.

According to an example embodiment, the sensing element 200 includes an event sensor 210, a difference amplifier 220, and an event signal generator 230.

The event sensor 210 may sense occurrence of an event and may output an input signal. For example, the event sensor 210 may include a photodiode 211 and a converter 212.

The photo diode 211 may output a current which corresponds to a change in the intensity of received light, in response to receiving the light. The converter 212 may convert the current output from the photo diode 211 into an input signal in the form of voltage. The converted input signal may be transferred to the difference amplifier 220.

The difference amplifier 220 may amplify the input signal received from the event sensor 210.

The event signal generator 230 may process the amplified input signal and may generate an event signal corresponding to the amplified input signal. For example, the event signal generator 230 may include an event determination unit 231 and an event transfer unit 232.

The event determination unit 231 may determine whether an event occurs, a type of the event based on the amplified input signal and may generate an event signal corresponding to the determination result. For example, the event determination unit 231 may determine whether an event occurs, based on a result of comparing the amplified input signal with a preset threshold value. In response to the case where the event occurring, the event determination unit 231 may determine a type of the event (e.g., an ON event or an OFF event) and may generate an event signal corresponding to the event. For example, the event determination unit 231 may generate an event signal (e.g., "1" in the case of the ON event and "−1" in the case of the OFF event) corresponding to the determined event type (e.g., an ON event or an OFF event).

The event transfer unit 232 may output the event signal generated by the event determination unit 231 to the outside of the event array 110.

Figure 3:
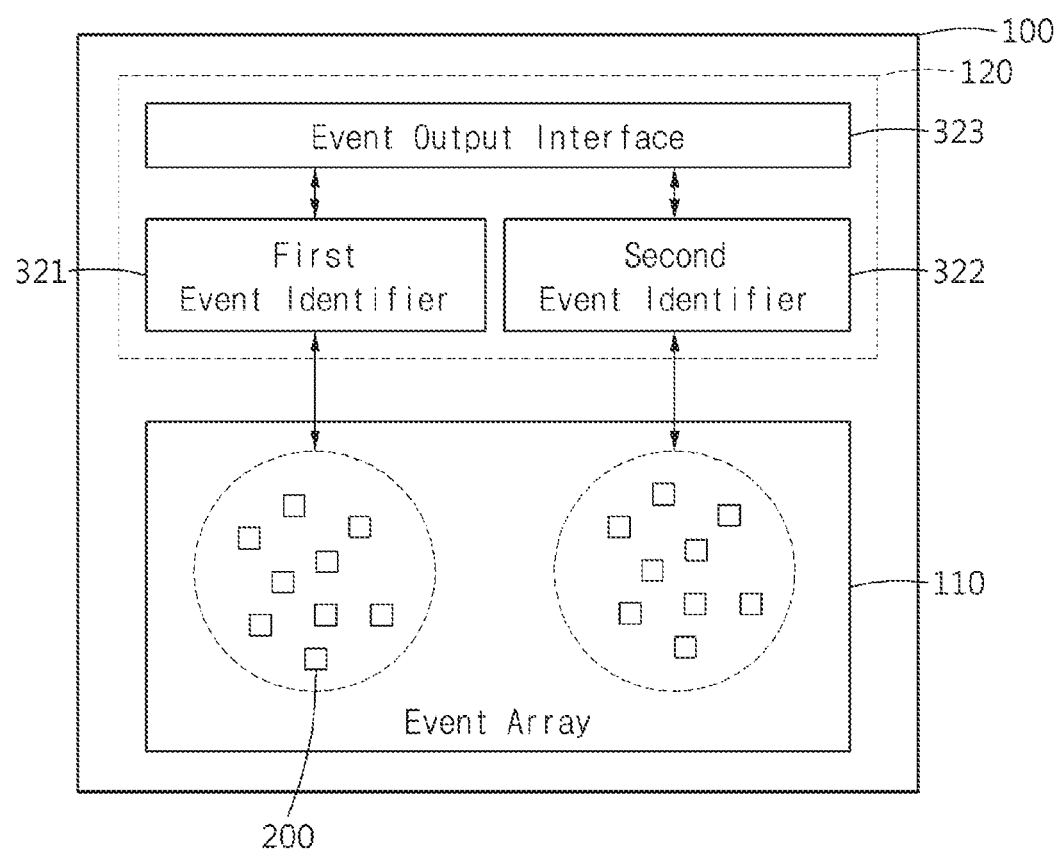
FIG. 3 is a block diagram illustrating a detailed configuration of a data output device, according to an example embodiment.

FIG. 3 is a block diagram illustrating a detailed configuration of a data output device, according to an example embodiment.

The data output device 100 may include the event array 110 and the event processor 120.

The event array 110 includes a plurality of sensing elements as described with reference to FIG. 1. The sensing element 200 operates as described with reference to FIG. 2.

The event processor 120 may include a first event identifier 321, a second event identifier 322, and an event output interface 323. The event processor 120 may asynchronously receive an event signal from the event array 110. For example, the event processor 120 may determine and output a location of the sensing element 200 at which an event occurs using an address event representation (AER) protocol. The AER protocol may indicate an asynchronous handshaking protocol that is used to transfer an event signal. According to an example embodiment, how to identify a location of the sensing element 200 based on the AER protocol will be more fully described with reference to FIGS. 4 to 11.

The first event identifier 321 may be connected to a first sensing element among a plurality of sensing elements and may identify first element information corresponding to the first sensing element in response to the case where an event is detected by the first sensing element. The first element information may include first location information indicating a location of the first sensing element. The first location information may include an address of the first sensing element.

The first sensing element may indicate a sensing element that outputs the first element information to the first event identifier 321 and may be expressed as belonging to a first group. As illustrated in FIG. 3, the first event identifier 321 may form an electrical connection only with first sensing elements belonging to the first group.

For example, the first event identifier 321 may output first location information corresponding to the first sensing element. According to an example embodiment, the first location information may be information indicating an address of the first sensing element in the event array 110 and may include, for example, a column address indicating a location on a first axis and a row address indicating a location on a second axis. The column address may indicate one of a plurality of columns, and the row address may indicate one of a plurality of rows.

The second event identifier 322 may be connected to a second sensing element among a plurality of sensing elements and may identify second element information corresponding to the second sensing element in response to the case where an event is detected by the second sensing element. The second element information may include second location information indicating a location of the second sensing element.

The second sensing element may indicate a sensing element that outputs the second element information to the second event identifier 322 and may be expressed as belonging to a second group. As illustrated in FIG. 3, the second event identifier 322 may form an electrical connection only with second sensing elements belonging to the second group.

For example, the second event identifier 322 may output second location information corresponding to the second sensing element. According to an example embodiment, the second location information may be information indicating an address of the second sensing element in the event array 110 and may include, for example, a column address indicating a location on the first axis and a row address indicating a location on the second axis.

A location of the first sensing element may not overlap a location of the second sensing element. For example, a location of each of first sensing elements on the first axis may be different from a location of each of second sensing elements on the first axis. Also, a location of each of first sensing elements on the second axis may be different from a location of each of second sensing elements on the second axis. A connection between each sensing element and the first and second event identifiers 321 and 322 will be more fully described below.

The event output interface 323 may output event information based on at least one among the first element information and the second element information. For example, the event output interface 323 may output an event point, at which an event occurs, based on at least one among the first location information and the second location information. According to an example embodiment, the event point may indicate a two-dimensional location of a sensing element, at which an event is detected, of a plurality of sensing elements included in the event array 110. The two-dimensional location of the sensing element may be information of a combination of addresses (coordinates), which respectively indicate a location on the first axis and a location on the second axis in an area corresponding to the event array 110.

According to an example embodiment, the event output interface 323 may output the first location information corresponding to the first sensing element at which an event is detected, of a plurality of first sensing elements connected to the first event identifier 321. Also, the event output interface 323 may output the second location information corresponding to the second sensing element at which an event is detected, of a plurality of second sensing elements connected to the second event identifier 322. For example, the first location information may be information that indicates a two-dimensional location of the first sensing element at which an event is detected. For example, the second location information may be information that indicates a two-dimensional location of the second sensing element at which an event is detected. The event point output by the event output interface 323 may be a point that is based on the first location information, a point that is based on the second location information, or a point that is based on a combination of the first location information and the second location information.

FIG. 3 illustrates an example embodiment in which a plurality of sensing elements included in the event array 110 are classified only into the first group corresponding to the first event identifier 321 and the second group the second event identifier 322. However, example embodiments are not limited thereto. For example, the event processor 120 may further include a third event identifier. The third event identifier may be connected to a third sensing element among a plurality of sensing elements and may identify third element information corresponding to the third sensing element in response to the case where an event is detected by the third sensing element. Here, the event output interface 323 may output event information based further on the third element information. Each event identifier may be implemented with an independent circuit or block.

In addition, the event array 110 may include a plurality of sensing elements, and the plurality of sensing elements may be classified into "n" groups. Here, "n" may be an integer of 1 or more. A data output device may include "n" event identifiers that identify element information corresponding to a sensing element classified into one of the "n" groups; and the event output interface that outputs the event information based on element information. For example, in response to the case where an event is detected by a sensing element belonging to an m-th group of the "n" groups, the m-th event identifier may identify element information corresponding to a sensing element at which the event is detected. Here, "m" may indicate an integer that is not less than "1" and is not more than "n". In this case, the event output interface 323 may output event information based on at least one of "n" element information.

Figure 4:
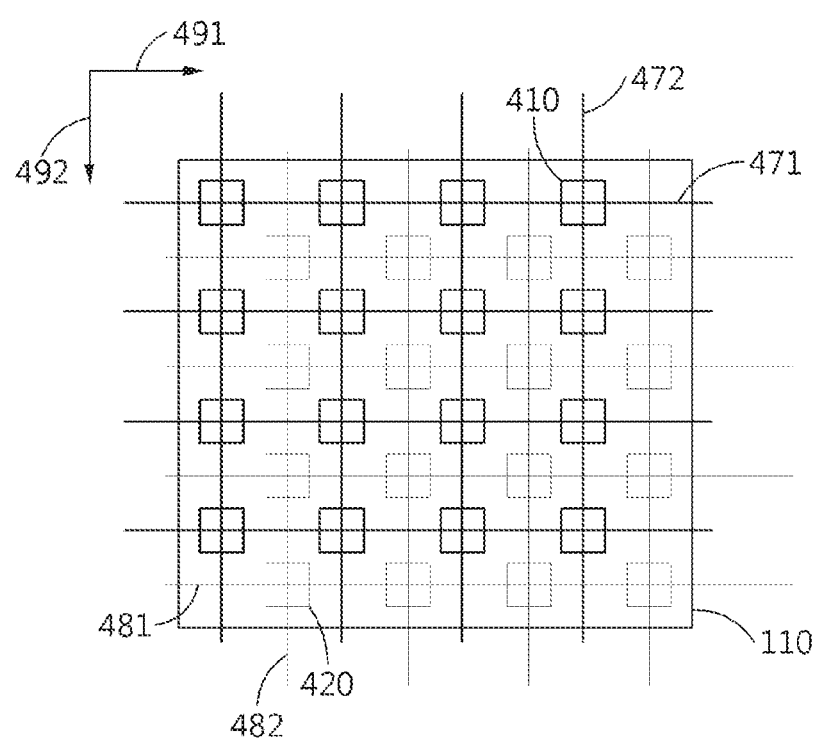
FIG. 4 is a drawing illustrating arrangement of an event array, according to an example embodiment.

FIG. 4 is a drawing illustrating arrangement of an event array, according to an example embodiment.

According to an example embodiment, sensing elements may be arranged in a diagonal direction in the event array 110. For example, the event array 110 may include a first sensing element 410 and a second sensing element 420. FIG. 4 describes a structure in which the first sensing element 410 and the second sensing element 420 are alternately arranged. For example, the first sensing element 410 and the second sensing element 420 may be alternately arranged with respect to the first axis, and the first sensing element 410 and the second sensing element 420 may be alternately arranged with respect to the second axis. For example, the first sensing element 410 may be located at the even-numbered column and the even-numbered row, and the second sensing element 420 may be located at the odd-numbered column and the odd-numbered row.

Below, the first axis may indicate any axis, and the second axis may indicate an axis that is distinguished from the first axis. The first axis and the second axis may be line axes that cross to be perpendicular to each other. For example, the first axis may indicate a lateral axis, and the second axis may indicate a longitudinal axis. A first axis direction 491 may indicate a direction that the first axis faces and may indicate, for example, a direction that faces a right side as a lateral axis direction. A second axis direction 492 may indicate a direction that the second axis faces and may indicate, for example, a direction that faces a lower side as a longitudinal axis direction. However, the first and second axis directions 491 and 492 are not limited thereto. In addition, the number of axis directions is not limited to "2". For example, in the case where sensing elements are arranged three-dimensionally, sensing elements may be also arranged in a third axis direction (e.g., a z-axis direction).

According to an example embodiment, the first sensing element 410 and the second sensing element 420 may be arranged in the first axis direction 491 and the second axis direction 492. For example, the first axis direction 491 may indicate an x-axis direction as a lateral direction as illustrated in FIG. 4, and the second axis direction 492 may indicate a y-axis direction as illustrated in FIG. 4.

For example, the first sensing elements 410 may be arranged at intersections of first longitudinal axes 472 that are spaced apart from each other in parallel in the event array 110 and first lateral axes 471 that are spaced apart from each other in parallel in the event array 110. The second sensing elements 420 may be arranged at intersections of second longitudinal axes 482 that are parallel with the first longitudinal axes 472 in the event array 110 and second lateral axes 481 that are parallel with the first lateral axes 471 in the event array 110. An example is described as spacing between the first longitudinal axes 472 is the same as spacing between the first lateral axes 471. However, example embodiments are not limited thereto. For example, spacing between the first longitudinal axes 472 may be different from spacing between the first lateral axes 471. An example is described as spacing between the second longitudinal axes 482 is the same as spacing between the second lateral axes 481. However, example embodiments are not be limited thereto. For example, spacing between the second longitudinal axes 482 may be different from spacing between the second lateral axes 481.

According to an example embodiment, each sensing element may be arranged on one of a plurality of second axes with respect to the second axis direction 492, and sensing elements arranged at the same second axis may have the same location on the first axis. Each sensing element may be arranged on one of a plurality of first axes with respect to the first axis direction 491, and sensing elements arranged at the same first axis may have the same location on the second axis.

For example, the first sensing elements 410 may be arranged along the first longitudinal axes 472 with respect to the second axis direction 492 and may be arranged along the first lateral axes 471 with respect to the first axis direction 491. The second sensing elements 420 may be arranged along the second longitudinal axes 482 with respect to the second axis direction 492 and may be arranged along the second lateral axes 481 with respect to the first axis direction 491. Here, the first longitudinal axes 472 and the second longitudinal axes 482 may be spaced apart from each other along the first axis, and the first lateral axes 471 and the second lateral axes 481 may be spaced apart from each other along the second axis.

Figure 5:
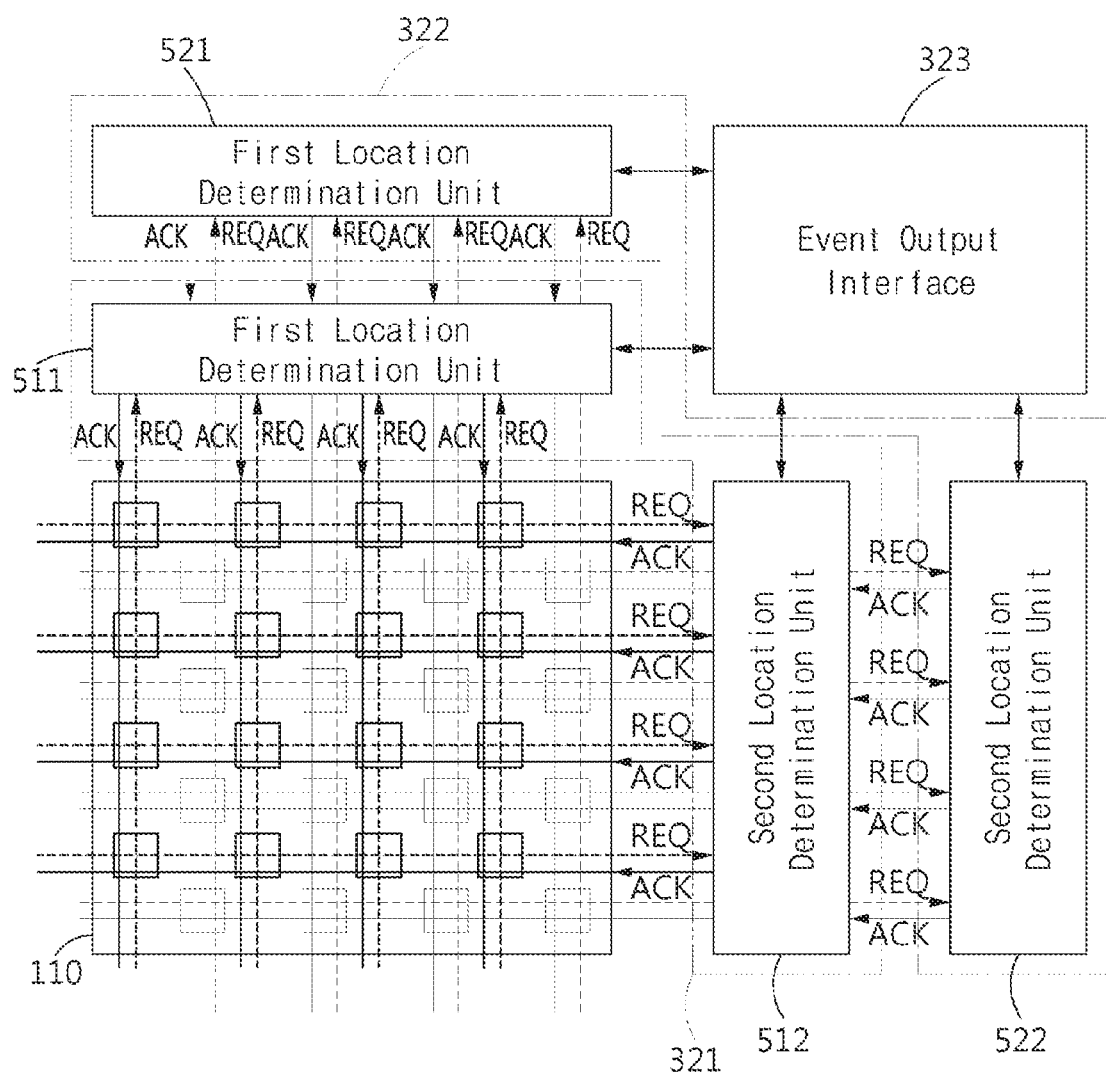
FIG. 5 is a drawing illustrating a data output device, according to an example embodiment.

FIG. 5 is a drawing illustrating a data output device, according to an example embodiment.

As described above, an event processor of a data output device may include the first event identifier 321 and the second event identifier 322. The first event identifier 321 may include a first location determination unit 511 and a second location determination unit 512, and the second event identifier 322 may include a first location determination unit 521 and a second location determination unit 522.

According to an example embodiment, the first location determination units 511 and 521 may identify a location of a sensing element, at which an event is detected, on the first axis. For example, the first location determination units 511 and 512 may identify locations of sensing elements which are arranged along the same second axis. The first locations of the identified sensing elements are the same. For example, the first location determination units 511 and 521 may identify a column address.

The first location determination unit 511 of the first event identifier 321 may receive a request signal REQ from a first sensing element at which an event is detected. In response to an input of the corresponding request signal REQ, the first location determination unit 511 may identify a location of the first sensing element, at which the event is detected, on the first axis and, in addition, may receive an event signal output by the first sensing element. The first location determination unit 511 may transmit an acknowledge signal ACK to the corresponding first sensing element in response to the case where a location of the first sensing element, at which the event is detected, is identified.

The first location determination unit 521 of the second event identifier 322 may receive a request signal REQ from a second sensing element at which an event is detected. In response to an input of the corresponding request signal REQ, the first location determination unit 521 may identify a location of the second sensing element, at which the event is detected, on the first axis and, in addition, may receive an event signal output by the second sensing element. The first location determination unit 521 may transmit an acknowledge signal ACK to the corresponding second sensing element in response to the case a location of the second sensing element, at which the event is detected, is identified.

According to an example embodiment, the second location determination units 512 and 522 may identify a location of a sensing element, at which an event is detected, on the second axis. For example, the second location determination units 512 and 522 may identify locations of sensing elements which are arranged along the same first axis. The second locations of the identified sensing elements are the same. For example, the second location determination units 512 and 522 may identify a row address.

The second location determination unit 512 of the first event identifier 321 may receive a request signal REQ from a first sensing element at which an event is detected. In response to an input of the corresponding request signal REQ, the second location determination unit 512 may identify a location of a first sensing element, at which an event is detected, on the second axis.

The second location determination unit 522 of the second event identifier 322 may receive a request signal REQ from a second sensing element at which an event is detected. In response to an input of the corresponding request signal REQ, the second location determination unit 522 may identify a location of a second sensing element, at which an event is detected, on the second axis.

In FIG. 5, the first event determination unit 511 included in the first event identifier 321 and the first event determination unit 521 included in the second event identifier 322 are illustrated as being independent of each other, and the second event determination unit 512 included in the first event identifier 321 and the second event determination unit 522 included in the second event identifier 322 are illustrated as being independent of each other. However, example embodiments are not limited thereto. For example, a unit cell included in the first location determination unit 511 and a unit cell included in the first location determination unit 521 may be alternately arranged along the first axis in the same space. Also, a unit cell included in the second location determination unit 512 and a unit cell included in the second location determination unit 522 may be alternately arranged along the second axis in the same space.

As another example, the first location determination unit 511 of the first event identifier 321 and the first location determination unit 521 of the second event identifier 322 may be arranged in different layers that overlap (e.g., layers in which locations on the third axis are different and two-dimensional locations thereof are the same), and the second location determination unit 512 of the first event identifier 321 and the second location determination unit 522 of the second event identifier 322 may be arranged in different layers in which two-dimensional locations thereof are the same. In addition, in the case where sensing elements are arranged in the third axis direction, each of the first and second event identifiers 321 and 322 may further include a third location determination unit to identify a location of each sensing element on the third axis.

The event output interface 323 may receive information associated with locations of sensing elements, at which an event is detected, from the first and second event identifiers 321 and 322 and may output an event point at which an event occurs based on the received information.

Figure 6:
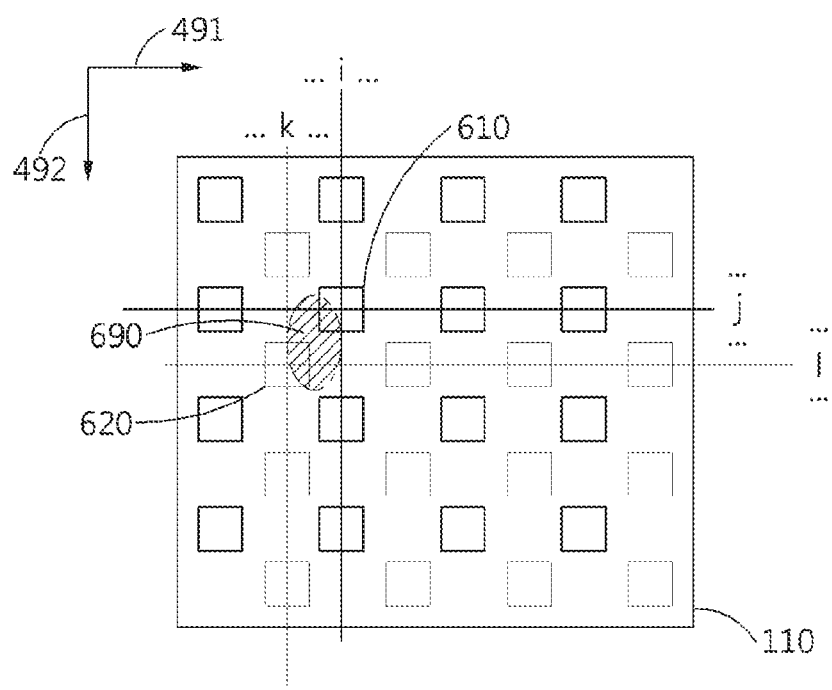
FIG. 6 is a drawing illustrating an event address output when an event is detected, according to an example embodiment.

FIG. 6 is a drawing illustrating an event address output when an even is detected, according to an example embodiment.

As described above with reference to FIG. 5, each event identifier may include a first location determination unit and a second location determination unit, and may identify a location of each of sensing elements, that are arranged in the event array 110, on each axis.

According to an example embodiment, sensing elements which are arranged along the same first axis may be connected to the first location determination unit through the same electrical connection (e.g., a wiring or a line). The first location determination unit may determine a location on the first axis based on an order in which a sensing element, at which an event is detected, is electrically connected to the first location determination unit. Also, sensing elements which are arranged along the same second axis may be connected to the second location determination unit through the same electrical connection (e.g., a wiring or a line). The second location determination unit may determine a location on the second axis based on an order in which a sensing element, at which an event is detected, is electrically connected to the second location determination unit.

In FIG. 6, the case where an area 690, at which an event occurs, is detected by the first sensing element 610 and a second sensing element 620 is illustrated.

First, a process of identifying a location of the first sensing element 610 is described. In response to the case where an event is detected by the i-th first sensing element 610 connected to the first location determination unit, the first location determination unit of the first event identifier may determine a location (e.g., an address) designated to an i-th first sensing element 610 as a location on the first axis. Here, "i" may be an integer of 1 or more, and the maximum value of "i" may be the number of first sensing elements 610 arranged in the first axis direction 491. The i-th connected first sensing element 610 may indicate a sensing element in which an i-th electrical connection with the first location determination unit is formed in the first axis direction 491 from a reference axis (e.g., the leftmost axis) on the first axis. A location designated to the i-th first sensing element 610 may indicate an address in the event array 110, which is designated to the corresponding first sensing element on the first axis.

The left uppermost point may be set as an origin point with respect to an address in the event array 110, but example embodiments are not limited thereto. For example, a center point in the event array 110 may be set as the origin point.

In response to the case where an event is detected by the j-th first sensing element 610 connected to the second location determination unit, the second location determination unit of the first event identifier may determine a location designated to a j-th first sensing element 610 as a location on the second axis. Here, "j" may be an integer of 1 or more, and the maximum value of "j" may be the number of first sensing elements 610 arranged in the second axis direction 492. The j-th connected first sensing element 610 may indicate a sensing element in which a j-th electrical connection with the second location determination unit is formed in the second axis direction 492 from a reference axis (e.g., the uppermost axis) on the second axis.

A location of the second sensing element 620 may be identified through a process that is similar to that of the first sensing element 610. In response to the case where an event is detected by the k-th second sensing element 620 connected to the first location determination unit, the first location determination unit of the second event identifier may determine a location designated to a k-th second sensing element as a location on the first axis. Here, "k" may be an integer of 1 or more, and the maximum value of "k" may be the number of second sensing elements arranged in the first axis direction 491. The k-th connected second sensing element 620 may indicate a sensing element in which a k-th electrical connection with the first location determination unit is formed in the first axis direction 491 from a reference axis (e.g., the leftmost axis) on the first axis.

In response to the case where an event is detected by the l-th second sensing element connected to the second location determination unit, the second location determination unit of the second event identifier may determine a location designated to an l-th second sensing element as a location on the second axis. Here, "l" may be an integer of 1 or more, and the maximum value of "l" may be the number of second sensing elements arranged in the second axis direction 492. The l-th connected second sensing element 620 may indicate a sensing element in which an l-th electrical connection with the second location determination unit is formed in the second axis direction 492 from a reference axis (e.g., the uppermost axis) on the second axis.

Figure 7:
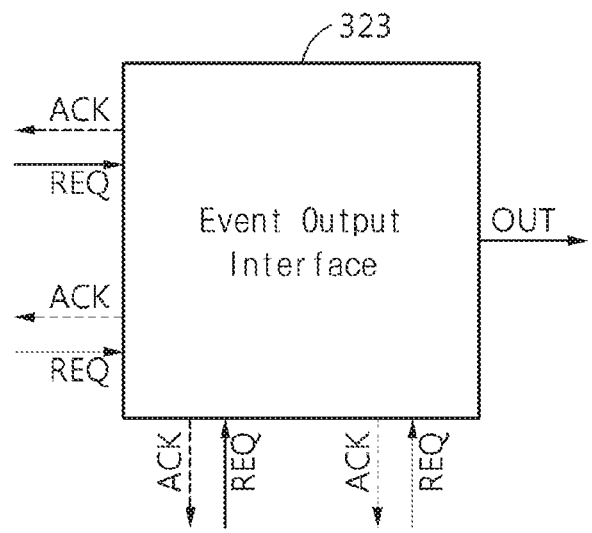
FIG. 7 is a drawing illustrating an event output interface, according to an example embodiment.

FIG. 7 is a drawing illustrating an event output interface, according to an example embodiment.

The event output interface 323 may receive first element information from a first event identifier, may receive second element information from a second event identifier, and may output event information OUT based on at least one among the first event information and the second event information. For example, when an event is detected only by the first sensing element, the event output interface 323 may output event information based on the first element information. When an event is detected only by the second sensing element, the event output interface 323 may output event information based on the second element information. In the case where an event is detected by both the first sensing element and the second sensing element, the event output interface 323 may output event information based on the first element information and the second element information.

According to an example embodiment, the event output interface 323 may receive first location information from the first event identifier and may transmit an acknowledge signal ACK to the first event identifier in response to an input of the first location information. In addition, the event output interface 323 may receive second location information from the second event identifier and may transmit an acknowledge signal ACK to the second event identifier in response to an input of the second location information.

The event information OUT that is information associated with an event may include location information indicating a location of a sensing element at which an event is sensed. Also, the event information OUT may include an event signal generated by each sensing element.

Figure 8:
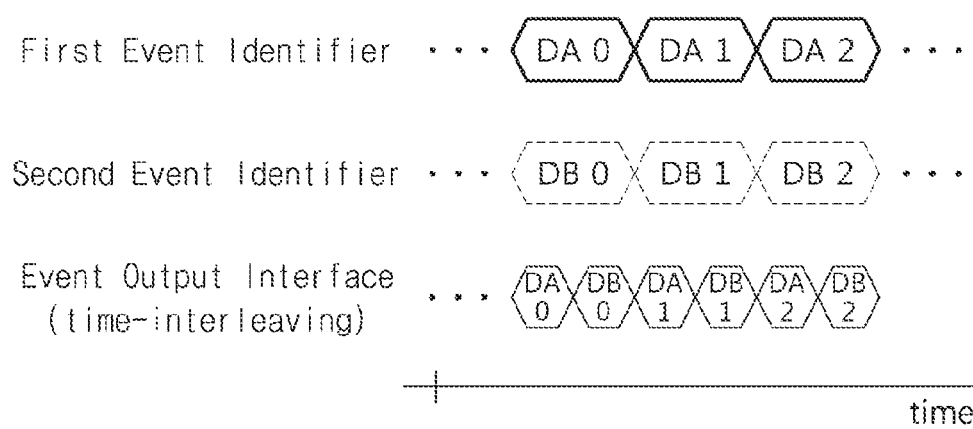
FIGS. 8 and 9 are drawings illustrating operation timing of another event output interface, according to an example embodiment.
Figure 9:
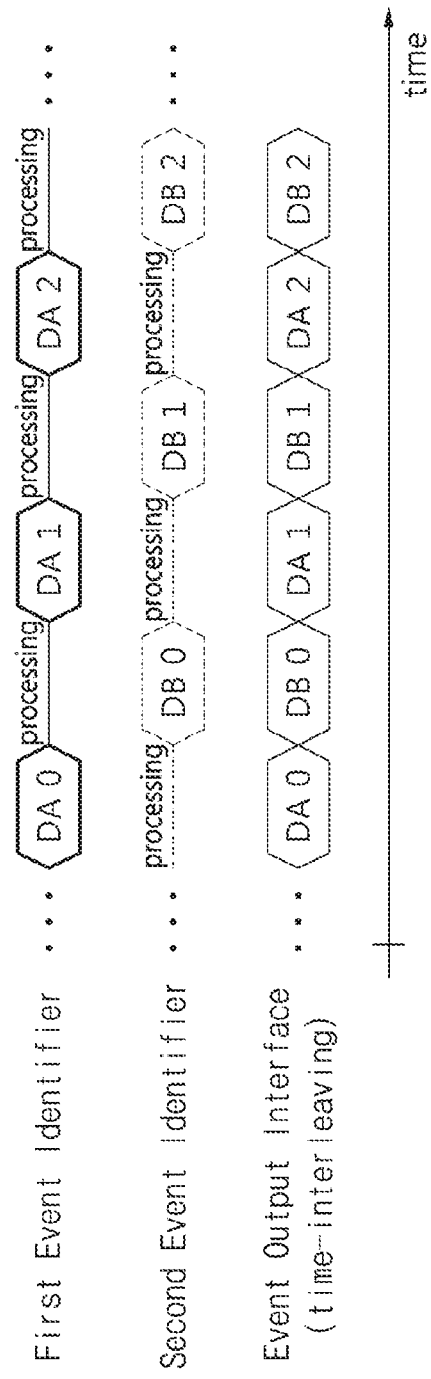

FIGS. 8 and 9 are drawings illustrating operation timing of another event output interface, according to an example embodiment.

FIG. 8 shows an example in which an event output interface operates based on time-interleaving. According to an example embodiment, a first event identifier may output first location information to an event output interface during a cycle, and a second event identifier may output second location information to the event output interface during the same cycle. The event output interface may receive the first location information during at least a portion of the above-described cycle and may output an event address corresponding to the first location information to the outside; the event output interface may receive the second location information during the remaining period of the above-described cycle and may output an event address corresponding to the second location information to the outside. For example, the above-described portion of the cycle may be a period corresponding to half the cycle, and the remaining period may be a period corresponding to the remaining half thereof.

For example, in a first cycle, the first event identifier may output the first location information (e.g., DA0), and the second event identifier may output the second location information (e.g., DB0). The event output interface may output the first location information (e.g., DA0) to the outside during a period of the cycle and may output the second location information (e.g., DB0) to the outside during the remaining period by interleaving the cycle. The event output interface may alternately output the first location information and the second location information for each cycle based on an interleaving period of each cycle. However, example embodiments are not limited thereto. For example, in the case where the data output device includes "n" event identifiers, the event output interface may sequentially output "n" location information, which respectively correspond to the "n" event units, by interleaving each cycle into "n" periods. Here, "n" may be an integer of 1 or more.

FIG. 9 shows an example in which an event output interface operates based on pipelining. According to an example embodiment, a first event identifier may output first location information during a first cycle, and a second event identifier may output second location information to the outside during a second cycle. The second event identifier may perform processing to output the second location information during the first cycle and may output the second location information during the second cycle. Accordingly, the second event identifier may output data while the first event identifier processes data. In contrast, the second event identifier processes data while the first event identifier outputs data.

The event output interface may output an address corresponding to the first location information to the outside during the first cycle and may output an address corresponding to the second location information during the second cycle. However, example embodiments are not limited thereto. For example, in the case where the data output device includes "n" event identifiers, an m-th event identifier may output m-th location information every m-th cycle during "n" cycles. Here, "m" may be an integer that is not less than 1 and is not more than "n". The event output interface may sequentially output "n" location information respectively corresponding to the "n" event identifiers by outputting the m-th location information in the m-th cycle.

Figure 10:
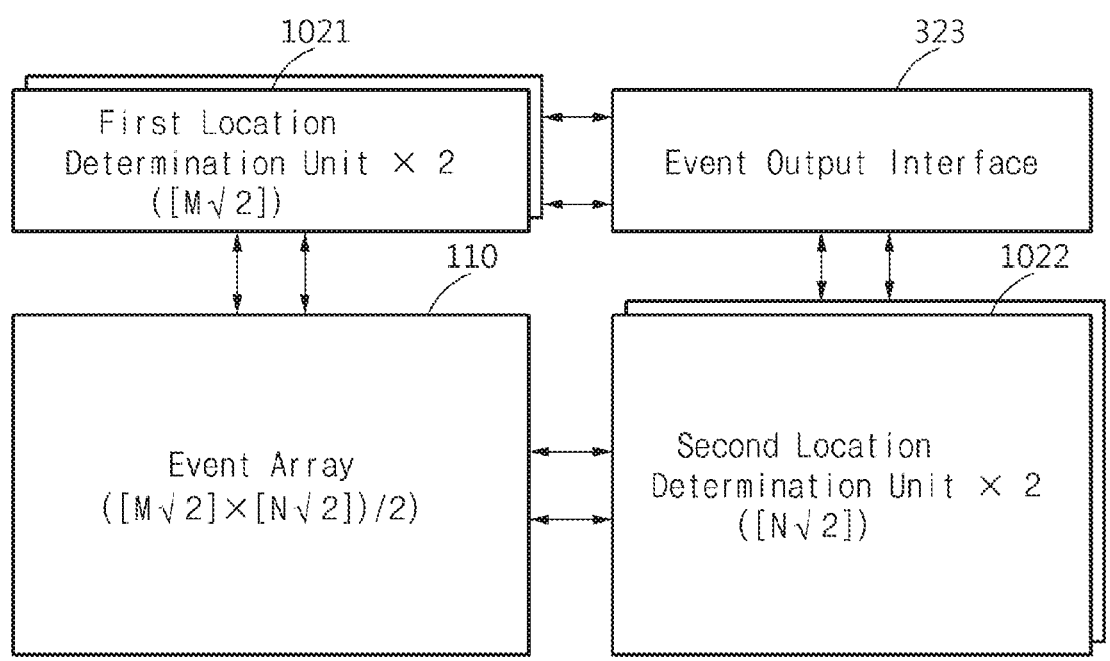
FIGS. 10 and 11 are drawings a resolution of an event output interface that is based on the number of sensing elements included in an event array, according to an example embodiment.
Figure 11:
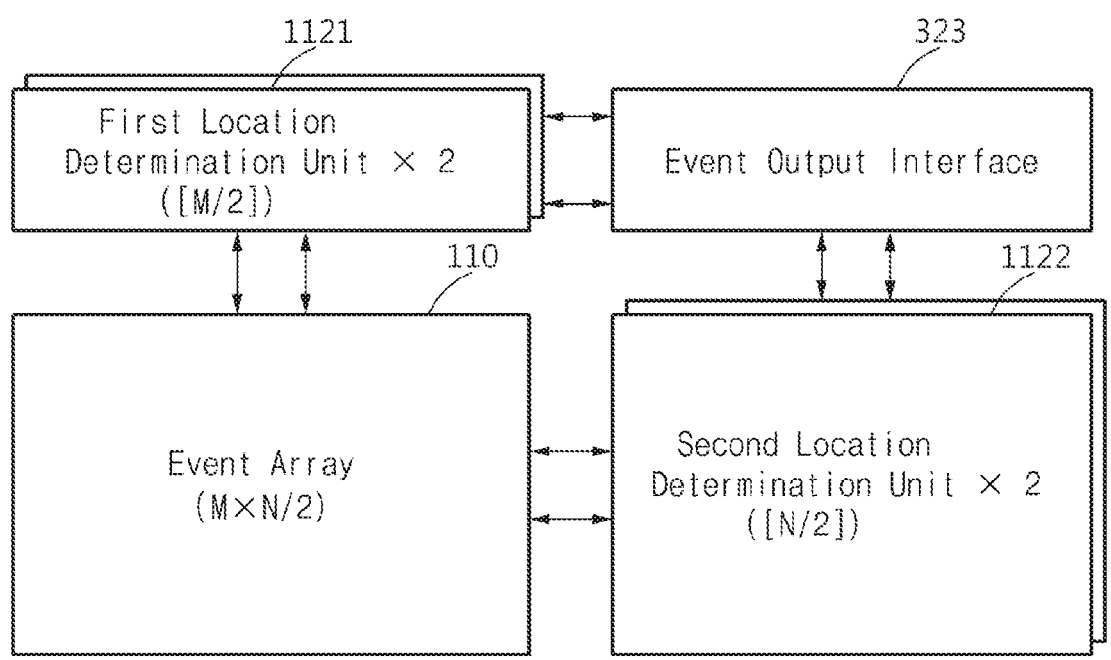

FIGS. 10 and 11 are drawings a resolution of an event identifier that is based on the number of sensing elements included in an event array, according to an example embodiment.

FIG. 10 illustrates the event array 110 of a structure in which "M" sensing elements are arranged in the first axis direction and "N" sensing elements are arranged in the second axis direction. Here, "M" and "N" may be integers of 1 or more.

According to an example embodiment, the event array 110 may include first sensing elements that are located at intersections of first longitudinal axes, the number of which corresponds to $M/\sqrt{2}$ and which are arranged in parallel with each other, and first lateral axes, the number of which corresponds to $N/\sqrt{2}$ and which are arranged in parallel with each other, and second sensing elements that are located at intersections of second longitudinal axes, the number of which corresponds to $M/\sqrt{2}$ and which are arranged in parallel with each other, and second lateral axes, the number of which corresponds to $N/\sqrt{2}$ and which are arranged in parallel with each other. For example, the number corresponding to $M/\sqrt{2}$ may indicate a value that is rounded off to the largest integer less than $M/\sqrt{2}$. The number corresponding to $N/\sqrt{2}$ may indicate a value that is rounded off to the largest integer less than $N/\sqrt{2}$. However, example embodiments are not limited thereto. For example, the number corresponding to $M/\sqrt{2}$ may be one of a round-up value, a round-down value, and a round-off value of $M/\sqrt{2}$, and the number corresponding to $N/\sqrt{2}$ may be one of a round-up value, a round-down value, and a round-off value of $N/\sqrt{2}$.

According to the above description, the first sensing elements, the number of which corresponds to $M/\sqrt{2}$, and the second sensing elements, the number of which corresponds to $M/\sqrt{2}$, may be arranged along the first axis. The first sensing elements, the number of which corresponds to $N/\sqrt{2}$, and the second sensing elements, the number of which corresponds to $N/\sqrt{2}$, may be arranged along the second axis. With the above description, a first location determination unit 1021 of each event identifier may identify an event point with a resolution of $M/\sqrt{2}$, and a second location determination unit 1022 may identify an event point with a resolution of $N/\sqrt{2}$. The case where the number of event identifiers is "2" is illustrated in FIG. 10, and thus, the event output interface 323 may identify an event point with a resolution of $(2 \times M/\sqrt{2}) \times (2 \times N/\sqrt{2})$ $(=2 \times (M \times N))$ through $(M\sqrt{2} \times N/\sqrt{2})/2$ $(=M \times N)$ sensing elements.

FIG. 11 illustrates the event array 110 of a structure in which sensing elements, the number of which corresponds to $M/\sqrt{2}$, are arranged in the first axis direction and sensing elements, the number of which corresponds to $N/\sqrt{2}$, are arranged in the second axis direction.

According to an example embodiment, the event array 110 may include first sensing elements that are located at intersections of first longitudinal axes, the number of which corresponds to M/2 and which are arranged in parallel with each other, and first lateral axes, the number of which corresponds to N/2 and which are arranged in parallel with each other, and second sensing elements that are located at intersections of second longitudinal axes, the number of which corresponds to M/2 and which are arranged in parallel with each other, and second lateral axes, the number of which corresponds to N/2 and which are arranged in parallel with each other. Here, each of "M" and "N" may be a multiple of 2.

According to the above description, the first sensing elements, the number of which corresponds to M/2, and the second sensing elements, the number of which corresponds to M/2, may be arranged along the first axis. The first sensing elements, the number of which corresponds to N/2, and the second sensing elements, the number of which corresponds to N/2, may be arranged along the second axis. With the above description, a first location determination unit 1121 of each event identifier may identify an event point with a resolution of M/2, and a second location determination unit 1122 may identify an event point with a resolution of N/2. The case where the number of event identifiers is "2" is illustrated in FIG. 11, and thus, the event output interface 323 may identify an event point with a resolution of (M×N) through "(M×N)/2" sensing elements.

According to an example embodiment, an effective resolution of an event array may be improved through sensing elements that are arranged in a diagonal direction. As such, a high effective resolution may be accomplished by using sensing elements the number of which is relatively small, thereby reducing an entire area of a chip and improving the performance.

Also, communication between a plurality of sensing elements and an event processor is processed by a plurality of event identifiers, thereby improving an event processing speed. For example, according to an example embodiment, a data communication device may shorten a time needed to transfer an event signal and location information from an event array to an event output interface.

At least one of the components, elements, modules or units represented by a block as illustrated in FIGS. 1-3, 5, 7, 10 and 11 may be realized by hardware elements, software elements and/or combinations thereof. For example, at least one of least one of these components, elements, modules or units may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit or processor may execute an operating system (OS) and one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods corresponding to the above-described example embodiments may be implemented by various instructions executable by a computer and may be recorded in a non-transitory computer-readable medium. The non-transitory computer-readable medium may include program instructions, data files, data structures, etc. independently or may include a combination thereof. The program instructions recorded in the medium may be designed and configured specially for example embodiments or be known and available to those skilled in computer software. The non-transitory computer-readable medium may include hardware devices, which are specially configured to store and execute program instructions, such as magnetic media, magnetic media (e.g., a hard disk drive, a floppy disk, and a magnetic tape) optical media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like. The described hardware devices may be configured to act as one or more software modules to perform the operations of the above-described exemplary embodiments, or vice versa.

While aspects of example embodiments have been described, it will be apparent to those skilled in the art that various changes and modifications may be made without departing from the spirit and scope. Therefore, it should be understood that the above-discussed example embodiments are not limiting, but illustrative.

What is claimed is:

1. A dynamic vision sensor comprising:
   an event array including a first sensing element group and a second sensing element group, the first sensing element group comprising first unit cells disposed on a first layer, and the second sensing element group comprising second unit cells disposed on a second layer;
   a first event identifier configured to receive first event signals detected by the first sensing element group and to output first location information in response to the first event signals, the first event identifier comprising a plurality of first longitudinal lines and a plurality of first lateral lines, the first unit cells being respectively located at intersections of the plurality of first longitudinal lines and the plurality of first lateral lines;

a second event identifier configured to receive second event signals detected by the second sensing element group and to output second location information in response to the second event signals, the second event identifier comprising a plurality of second longitudinal lines and a plurality of second lateral lines, the second unit cells being respectively located at intersections of the plurality of second longitudinal lines and the plurality of second lateral lines; and an event output interface configured to receive the first location information from the first event identifier, to receive the second location information from the second event identifier, and to output event information based on at least one of the first location information and the second location information, wherein the first sensing element group is independent from the second sensing element group.

2. The dynamic vision sensor of claim 1, wherein the second layer is different from the first layer.

3. The dynamic vision sensor of claim 1, wherein the first unit cells in the first sensing element group and the second unit cells in the second sensing element group are arranged alternately along a first axis in a same layer.

4. The dynamic vision sensor of claim 3, wherein the first unit cells in the first sensing element group and the second unit cells in the second sensing element group are arranged alternately along a second axis perpendicular to the first axis in the same layer, wherein the first unit cells are located at odd-numbered rows of a plurality of rows of the event array and odd-numbered columns of a plurality of columns of the event array, and wherein the second unit cells are located at even-numbered rows of the plurality of rows and even-numbered columns of the plurality of columns.

5. The dynamic vision sensor of claim 1, wherein first locations of the first unit cells in the first sensing element group and second locations of the second unit cells in the second sensing element group do not overlap.

6. The dynamic vision sensor of claim 1, wherein each of the first unit cells in the first sensing element group and each of the second unit cells in the second sensing element group are arranged in a diagonal direction in the event array.

7. The dynamic vision sensor of claim 1, wherein the first event identifier is further configured to identify a first address indicating a first unit cell of the first sensing element group which detects the first event signals, and wherein the second event identifier is further configured to identify a second address indicating a second unit cell of the second sensing element group which detects the second event signals.

8. The dynamic vision sensor of claim 1, wherein the event output interface is configured to output the event information with a resolution of $2 \times M \times N$, wherein the first unit cells are located at intersections of first longitudinal axes and first lateral axes, a number of the first longitudinal axes corresponding to $M/\sqrt{2}$ and a number of the first lateral axes corresponding to $N/\sqrt{2}$, wherein the second unit cells are located at intersections of second longitudinal axes and second lateral axes, a number of the second longitudinal axes corresponding to $M/\sqrt{2}$ and a number of the second lateral axes corresponding to $N/\sqrt{2}$, wherein a number of the first and second unit cells is $M \times N$, and wherein each of the M and N is an integer greater than zero.

9. The dynamic vision sensor of claim 1, wherein the plurality of first longitudinal lines and the plurality of first lateral lines are electrically isolated from the second unit cells.

10. The dynamic vision sensor of claim 9, wherein the plurality of second longitudinal lines and the plurality of second lateral lines are electrically isolated from the first unit cells.

11. A dynamic vision sensor comprising:
an event array including a first sensing element group and a second sensing element group;
a first event identifier configured to receive first event signals detected by the first sensing element group and to output first location information in response to the first event signals;
a second event identifier configured to receive second event signals detected by the second sensing element group and to output second location information in response to the second event signals; and
an event output interface configured to receive the first location information from the first event identifier, to receive the second location information from the second event identifier, and to output event information based on at least one of the first location information and the second location information,
wherein the first sensing element group is independent from the second sensing element group,
wherein the event output interface is configured to output the event information with a resolution of $M \times N$,
wherein the first sensing element group includes first unit cells located at intersections of first longitudinal axes and first lateral axes, a number of the first longitudinal axes corresponding to $M/2$ and a number of the first lateral axes corresponding to $N/2$,
wherein the second sensing element group includes second unit cells located at intersections of second longitudinal axes and second lateral axes, a number of the second longitudinal axes corresponding to $M/2$ and a number of the second lateral axes corresponding to $N/2$,
wherein a number of the first and second unit cells is $(M \times N)/2$, and
wherein each of the M and N is an integer greater than zero.

12. A dynamic vision sensor comprising:
an event array including a first sensing element group and a second sensing element group, the first sensing element group comprising first unit cells disposed on a first layer, and the second sensing element group comprising second unit cells disposed on a second layer; and
an event output interface configured to:
receive first location information generated based on first event signals detected by the first sensing element group via a plurality of first longitudinal lines and a plurality of first lateral lines, the first unit cells being respectively located at intersections of the plurality of first longitudinal lines and the plurality of first lateral lines; and
receive second location information generated based on second event signals detected by the second sensing element group via a plurality of second longitudinal lines and a plurality of second lateral lines, the second unit cells being respectively located at intersections of the plurality of second longitudinal lines and the plurality of second lateral lines, wherein the event output interface is configured to receive the first location information and the second location information at the same time, and wherein the first sensing element group is independent from the second sensing element group.

13. The dynamic vision sensor of claim 12, wherein the event output interface is further configured to alternately output the first location information and the second location information.

14. The dynamic vision sensor of claim 12, further comprising:

a first event identifier configured to receive the first event signals detected by the first sensing element group and to output the first location information to the event output interface; and a second event identifier configured to receive the second event signals detected by the second sensing element group and to output the second location information to the event output interface.

15. The dynamic vision sensor of claim 14, wherein the first event identifier configured to output the first location information to the event output interface during a cycle, wherein the second event identifier configured to output the second location information to the event output interface during the cycle, and wherein the event output interface is further configured to alternately output the first location information and the second location information by interleaving the cycle.

16. The dynamic vision sensor of claim 14, wherein the first event identifier configured to output the first location information to the event output interface during a cycle, wherein the second event identifier configured to output the second location information to the event output interface during the cycle, and wherein the event output interface is further configured to output the first location information during a first period of the cycle and to output the second location information during a second period of the cycle.

* * * * *